United States Patent [19]

Landamore

[11] 4,177,971
[45] Dec. 11, 1979

[54] SEA COCK VALVE

[75] Inventor: Leslie E. Landamore, Salhouse, England

[73] Assignee: Pilgrim Engineering Developments Limited, London, England

[21] Appl. No.: 798,109

[22] Filed: May 18, 1977

[51] Int. Cl.² ............................................. F16k 31/50
[52] U.S. Cl. .................................... 251/215; 114/198; 251/225; 251/265; 251/330
[58] Field of Search .............................. 137/243.5, 315; 251/213, 214, 215, 221, 222, 225, 264, 265, 273, 318, 319, 291, 82, 330; 114/183 R, 183 A, 184, 197, 198

[56] References Cited

U.S. PATENT DOCUMENTS

| 50,219 | 10/1865 | Chesley | 137/243.5 |
|---|---|---|---|
| 315,234 | 4/1885 | Brooks | 251/221 |
| 402,454 | 4/1889 | Horton | 114/198 |
| 616,275 | 12/1898 | Swenson | 251/221 |
| 648,923 | 5/1900 | Charette | 114/198 |
| 725,378 | 4/1903 | Tetley et al. | 251/225 |
| 1,017,434 | 2/1912 | Lowe | 251/225 |
| 1,315,828 | 9/1919 | Gillette | 251/221 |
| 1,667,203 | 4/1928 | Harris | 251/221 |
| 1,677,794 | 7/1928 | Mueller et al. | 251/221 |
| 2,230,434 | 2/1941 | Porter | 137/315 |
| 3,765,364 | 10/1973 | Booth | 114/198 |

Primary Examiner—Martin P. Schwadron
Assistant Examiner—G. L. Walton
Attorney, Agent, or Firm—Woodcock, Washburn, Kurtz & Mackiewicz

[57] ABSTRACT

A valve comprising a hollow cylindrical body with a valve opening at one end and a valve seat around the valve opening. A valve member is movable towards and away from the valve seat on a spindle which passes through a spindle opening opposite the valve opening. A handle is provided on the outer end of the valve spindle and has a screw-threaded counterbore which is engageable with a screw-threaded spigot on the outside of the valve around the spindle opening to hold the valve member in the closed position. In this position the end face of the valve member is flush with the outside of the valve around the valve opening. The upper side of the valve member has a screw-threaded counterbore engageable with a screw-threaded spigot on the inside of the valve around the spindle opening to hold the valve in the open state and form a seal around the spindle.

8 Claims, 2 Drawing Figures

SEA COCK VALVE

The present invention relates to a valve and is concerned especially with a valve for closing pipes on boats and other marine vessels, which communicate with the water outside the vessel. Such valves are sometimes known as sea cocks. The invention is however applicable to valves used in other fields.

On boats and other marine vessels it is common to have pipes which communicate with the sea through ports in the hull of the vessel. These pipes are used for taking in and letting out water, for example for cooling the engine of the vessel or for a w.c. Under certain circumstances such as for reducing turbulence when the vessel is under way, it is desirable to close the pipes. For this purpose the pipes are provided with valves or sea cocks.

The sea cocks at present used on boats usually take the form of a conventional screw cock in which the movable valve member is mounted on a screw-threaded stem which turns in a screw threaded bush to move the valve member between the closed position against the valve seat and the open position in which the valve member is spaced from the valve seat.

There are various problems associated with sea cocks of this kind.

With the existing designs, even when the sea cock is closed there is a dead water space in the cock which communicates with the sea. The space gives rise to turbulence when the boat is under way, impairing the performance of the hull. Sea creatures and vegetation may collect in the space and may eventually prevent the proper operation of the sea cock.

Another problem with the existing designs is that to move the valve from the fully open to the fully closed position it is necessary to give the operating member a large number of turns which makes altering the condition of the cock a slow operation. Even in the open condition the valve member may still partially obstruct the flow path between the valve inlet and the valve outlet.

Finally there are problems in providing a satisfactory seal between the valve stem or spindle and the valve body where the spindle emerges from the body. Usually a gland seal is provided which allows rotation of the spindle in the housing. Leaks are often a problem with such seals.

It is the object of the present invention to provide an improved valve which overcomes one or more of these problems.

According to the present invention in a first aspect there is provided a valve comprising a hollow valve body, a valve opening in said valve body, a valve seat in said valve body around said valve opening, a valve member movable towards and away from said valve seat to open and close the said valve, the valve member having an end surface which is substantially coplanar with the outer surface of said valve body around said valve opening when said valve member is seated in said valve seat, whereby said outer surface and said end surface present a smooth continuous surface when said valve is closed.

Thus when the valve is closed there is no dead space between the valve member and the valve opening. The valve can be mounted in the hull of a vessel with the outer surface coplanar with the outer surface of the vessel and with this arrangement when the valve is closed it presents a continuous surface to the water so that the presence of the valve in the skin of the vessel does not cause turbulence in the water when the vessel is under way.

According to the present invention in a second aspect there is provided a valve comprising a hollow valve body, a valve opening in said valve body, a valve seat in the said valve body around said valve opening, a spindle opening in said valve body opposite said valve opening, a valve member movable towards and away from said valve seat to open and close the said valve, a spindle carrying said valve member and extending through the said spindle opening, first screw-threaded means on the valve body to the outside of said valve body, second screw-threaed means on the spindle outside said valve body and adapted for mating with said first screw-threaded means on said valve body to hold said valve member against said valve seat, third screw-threaded means on the valve body to the inside of said valve body, fourth screw-threaded means on said spindle inside said valve body and adapted for mating with said third screw-threaded means on said valve body to the inside of the valve body for holding said valve member away from said valve seat, said spindle being slidable axially in said spindle opening between the position in which the first and second screw-threaded means engage to the position in which said third and fourth screw-threaded means engage. With this arrangement it is only necessary to turn the spindle in the screw threads at the ends of the path of travel between the open and closed positions, the intermediate movement being simple sliding movement. Thus the speed of opening and closing the valve is greater than compared with a valve where the complete traverse is executed by turning the spindle in screw threads.

According to the present invention in a third aspect there is provided a valve comprising a hollow generally cylindrical body, a valve opening in said body at one end of said body, a valve seat in said valve around said valve opening, a spindle opening in said body at the opposite end of said body to said valve opening, a valve member movable towards and away from said valve seat to open and close said valve, a spindle carrying said valve member and extending through said spindle opening, a branch pipe connected to the cylindrical portion of the valve body at a location between the said valve seat and the spindle opening and communicating with the interior of the valve body, the space in the valve body between the branch pipe and the spindle opening being sufficient to accommodate the valve member whereby the valve member can be removed completely from the path of fluid between the valve opening and the branch pipe.

According to the present invention in a fourth aspect there is provided a valve comprising a hollow valve body having an inlet and an outlet, a valve seat in the valve body, an aperture in the valve body opposite the valve seat, a valve spindle passing through the aperture, a valve member carried by the valve spindle and adapted in a valve closed position to engage the valve seat and close the inlet from the outlet, means for holding the valve member in the valve closed position, a sealing surface on the valve member, a sealing surface on the inside of the valve body around the said aperture adapted to form a seal with the sealing surface carried by the spindle when the valve is open and the valve member is moved fully away from the valve seat and means for holding the valve spindle in the valve open position and the sealing surfaces engaging so as to form a seal to prevent escape of fluid between the valve spindle and the valve in the fully open condition.

By this means the problems of sliding seals around the spindle are avoided.

An embodiment of the invention will now be described, by way of example, with reference to the accompanying drawings, in which:

FIG. 1 shows an axial section through a sea cock according to the invention in a glass-fibre reinforced plastics hull; and FIG. 2 shows a detail of the sea cock of FIG. 1 fitted in a wooden hull.

DESCRIPTION OF THE PREFERRED EMBODIMENT

Figure 1:
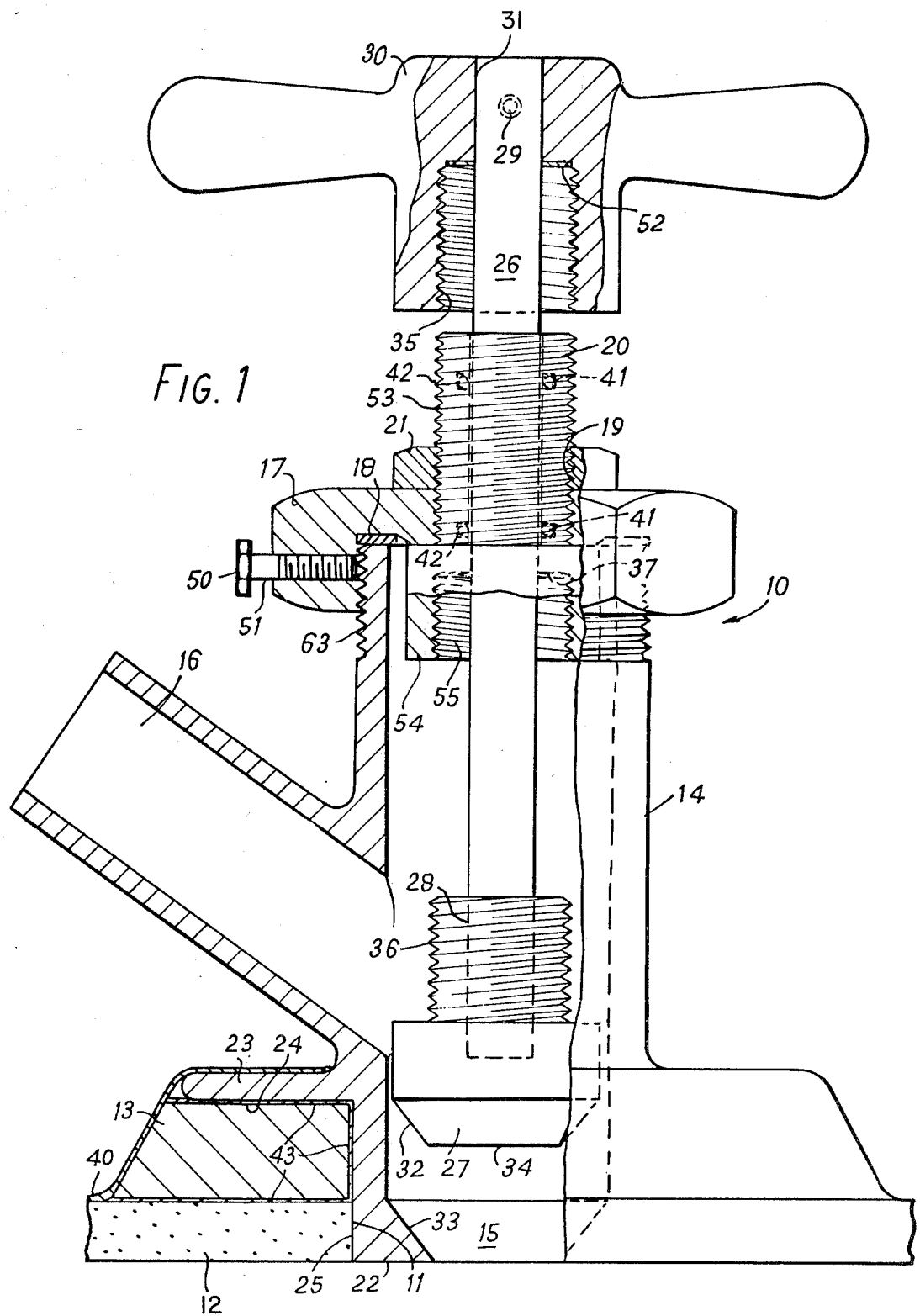

Referring to FIG. 1, this shows a valve according to the invention, in the form of a sea cock 10 fitted in a port 11 in the skin 12 of a yacht for taking in water from the sea.

The sea cock 10 comprises a hollow cylindrical valve body 14 with an inlet opening 15 at one end and an outlet pipe 16 connected to the sidewall of the valve body at a position about halfway along the valve body. The pipe 16 communicates with the interior of the valve body 14 and is inclined to the axis of the valve body so as to point away from the end with the inlet opening 15. The valve body and the outlet pipe are formed integrally from metal such as brass or gunmetal.

The valve body 14 has an outer end surface 22 adjacent inlet opening 15 which is smooth and flat. A circumferential flange 23 extends outwardly from the sidewall of the valve body at a position spaced axially from the outer end surface 22 so as to present a surface 24 which lies parallel to the surface 22. The portion 25 of the sidewall of the valve body which lies between the flange 23 and the outer end surface 22 has a smooth cylindrical surface.

Figure 2:
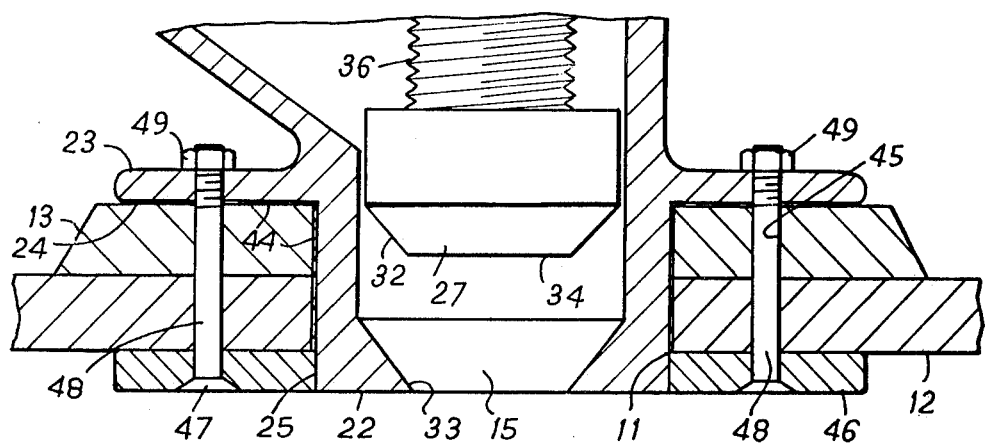

The portion 25 is fixed in the cylindrical port 11 in the skin 12 with a wooden packing piece 13 placed between the flange 23 and the skin 12 so that the surface 24 of the flange 23 bears against the packing piece 13 and the outer surface 22 of the end of the valve body lies flush with the outside of the skin. Alternatively the outer surface 22 may be fitted proud of the outer surface of the skin and when installation of the valve is completed the excess metal is ground off so that the surface 22 follows the contours of the hull. In the case of the glass-reinforced plastics hull as shown in FIG. 1 the packing piece and the flange are bedded in using a polyester based filler 43 and then, after cleaning the flange and surrounding area with acetone, the flange, packing piece and hull are bonded over with 4 oz. chopped strand mat 40. In the case of a wooden hull as shown in FIG. 2, the packing piece 13, and valve 10 are bedded in with a flexible sealant 44 and then the hull and flange are drilled with holes 45. As a safety precaution a metal ring 46 is placed on the outside of the skin 12 around the port 11 and this is drilled and countersunk to receive the heads 47 of bolts 48. Nuts 49 are then screwed onto the bolts and tightened to secure the valve in position.

The end 63 of the valve body remote from the opening 15 is externally screw-threaded to receive an internally screw-threaded cap 17. A neoprene rubber sealing ring 18 is placed between the cap and the end 63 of the cylindrical portion of the valve body to form a seal. The cap 17 has a faceted periphery so that it can be tightened with a spanner. A locking screw 50 fits in a radial tapped hole 51 in the cap 17 and is tightened to secure the cap 17 in position.

The cap 17 has a central screw-threaded bore 19 in which a tubular member 20 is fitted. The tubular member has a threaded portion 53 which is screwed into the bore 19 and secured in place by a locking nut 21 which, after tightening, may be fixed to the cap 17 with an epoxy resin adhesive to prevent it becoming loose in service. The tubular member 20 extends inwardly beyond the cap 17 into the valve body and outwardly beyond locking nut 21 to provide a screw-threaded spigot on the outside and an enlarged diameter portion 54 on the inside of the cap. The enlarged diameter portion 54 has a counterbore 55 around the spindle.

A cylindrical spindle 26 of steel extends with clearance through the bore in the tubular member 20. Two 'O' ring seals 41 are fitted in grooves 42 in the surface of the bore to form a sliding seal with the spindle. Secured to the inner end of the spindle 26 is a valve member 27 which has a bore 28 in which the spindle is fixed. The member 27 is of brass or gunmetal. Screwed to the outer end of the spindle 26 by means of a set screw 29 is a brass or gunmetal operating handle 30 which has a bore 31 for receiving the spindle.

The valve member 27 has a forwardly facing conical surface 32 which co-operates with a conical valve seat 33 around the opening 15 in the valve body 14. When the valve member 27 is in its forwardmost position the surface 32 seats against the surface of the valve seat 33 to close the inlet 15. In this position the forward end face 34 of the valve member 27 which is flat, is coplanar with the outer surface 22 so that there are no surface discontinuities and there is no dead space in the valve. In this way when the yacht is under way and the valve is closed turbulence around the valve inlet 15 is avoided.

For securing the valve in the closed position the underside of the handle 30 is provided with a screw-threaded counterbore 35 around the spindle 26 which co-operates with the portion of the screw-threaded sleeve 20 which lies on the outside of the valve body 14. A neoprene rubber sealing washer 52 is fitted in the counterbore 35 to provide an additional seal when the valve is closed.

A screw-threaded spigot 36 is provided on the upper side of the valve member 27 which co-operates with the screw-threaded counterbore 55 in the tubular member 20 on the inside of the valve body 14 to secure the valve member 27 in the open condition. A neoprene rubber sealing washer 37 is placed at the bottom of the counterbore 55 and forms a seal against the end of the portion of the screw-threaded spigot 36 that lies on the inside of the valve body when the valve member 27 is turned fully into the open condition. In this way a positive seal is provided around the spindle 26 when the valve is open and the problems encountered with conventional sliding seals are avoided.

To move the valve from the fully open to the fully closed position and vice versa the spindle 26 must be turned to engage and disengage the screw threads at either end of the travel but the intermediate movement is achieved by simply sliding the spindle in the aperture. In this way the time required to open and close the valve is reduced.

Finally, the space in the hollow valve body 14 above the branch pipe 16 is sufficient to enable the valve member to withdraw completely from the path of water between the valve inlet opening and branch pipe so that it does not interfere with the flow of fluid.

It will be apparent to those skilled in the art that this invention can assume various embodiments. The invention is not limited to the embodiment described above but is to be limited only by the appended claims. For example the sealing means for the spindle 26 when the valve is in the open position may comprise a screw-threaded spigot on the inside of the cap 17 and a screw-threaded counterbore on the upper side of the valve member 27.

Furthermore, as stated above the valve according to the invention can be used in applications other than as a sea cock. For example the valve can be used in pipelines which convey sticky substances such as oil pipelines. Such pipelines have to be cleaned at intervals by passing "pigs" along the pipeline. The valve of the invention enables branch pipes to be closed off completely and presents a smooth flush surface to the main pipe so that there is no cavity in which debris can collect when the pig is being passed along the pipe. The valve in a modified form can also be used with advantage where corrosive chemicals are being used. By machining suitable metal to metal sealing surfaces the sealing washers can be eliminated so that corrosion problems are avoided.

I claim:

1. A valve comprising:
   a hollow valve body;
   a valve opening in said valve body;
   a valve seat in the said valve body around said valve opening;
   closure means closing the valve body at the end opposite the valve opening;
   a spindle opening in said closure means;
   a valve member movable towards and away from said valve seat to open and close said valve;
   a spindle carrying said valve member and extending through the said spindle opening;
   first screw-threaded means on the closure means of the valve body to the outside of said valve body;
   second screw-threaded means fixed on the spindle outside said valve body and adapted for mating with said first screw-threaded means on said closure means of the valve body to hold said valve member against said valve seat;
   third screw-threaded means on the closure means of the valve body, to the inside of said valve body;
   fourth screw-threaded means on said spindle inside said valve body and adapted for mating with said third screw-threaded means on said closure means of the valve body to the inside of the valve body for holding said valve member away from said valve seat, said spindle being slidable axially in said spindle opening between the position in which the first and second screw-threaded means engage and the position in which said third and fourth screw-threaded means engage; and
   sealing surfaces carried on the closure means and on the said spindle which engage when the said third and fourth screw-threaded means engage to form a seal around the spindle opening.

2. A valve as claimed in claim 1 including an operating handle on said spindle wherein said first screw-threaded means comprise a screw-threaded spigot or a screw-threaded counterbore on said valve body said second screw-threaded means comprise a screw-threaded counterbore or a screw-threaded spigot on said handle, said third screw-threaded means comprise a screw-threaded counterbore or a screw-threaded spigot on the inside of said valve body, and said fourth screw-threaded means comprise a screw-threaded spigot or a screw-threaded counterbore on the valve member.

3. A valve as claimed in claim 1 wherein the valve body is generally cylindrical, and further including:
   a branch pipe connected to the cylindrical portion of the valve body at a location between the said valve seat and the spindle opening and communicating with the interior of the valve body, the space in the valve body between the branch pipe and the spindle opening being sufficient to accommodate the valve member whereby the valve member can be removed completely from the path of fluid between the valve opening and the branch pipe.

4. A valve as claimed in claim 1 including:
   a sealing surface on the valve member;
   a sealing surface on the inside of the valve body around said spindle opening adapted to form a seal with the sealing surface on the valve member when the valve is open and the valve member is moved fully away from the valve seat.

5. A valve as claimed in claim 4 including a counterbore on the inside of the valve body around said spindle opening and a spigot on the valve member, and wherein the sealing surface on said valve body comprises a resilient deformable sealing member seated at the bottom of the counter-bore, and said sealing surface on said valve member comprises the end of said spigot.

6. In a boat having a hull with inner and outer surfaces and an aperture in the hull, a valve as claimed in claim 4 mounted in the aperture,
   and wherein the valve body has an outer surface around the valve opening which is coplanar with the outer surface of the hull around the aperture;
   and wherein said valve member has an end surface which is substantially coplanar with the outer surface of said valve body and the outer surface of the hull surrounding the aperture when said valve member is seated in said valve seat, whereby, when said valve is closed, said end surface, said outer surface of said valve member and the outer surface of the hull around the aperture present a smooth continuous outer surface.

7. A valve as claimed in claim 6 wherein said valve body has a circumferential outwardly extending flange spaced axially from said outer surface and has a cylindrical portion between said flange and said surface, said cylindrical portion being mounted in the aperture and said flange engaging the inner surface of the hull around the aperture.

8. A valve as claimed in claim 6 wherein said valve seat comprises a frusto-conical surface around said inlet and said valve member has a corresponding frusto-conical surface.

* * * * *